Figure 1:
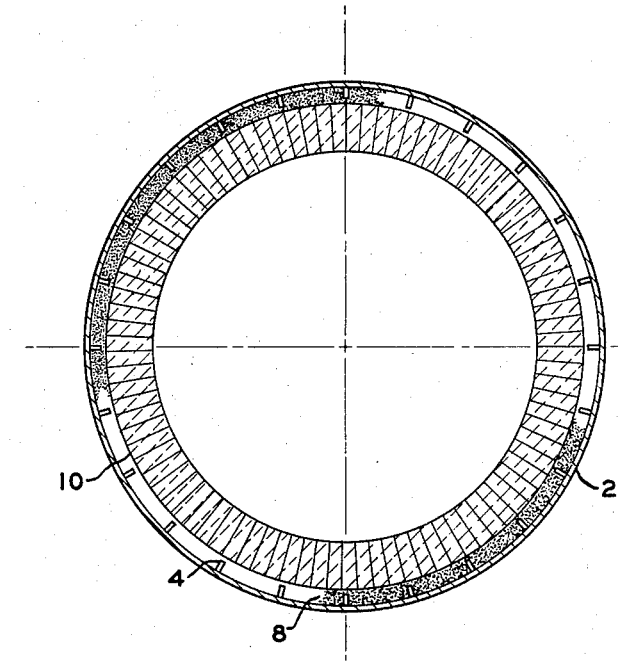

April 21, 1953  C. C. BRUMBAUGH  2,635,865
KILN LINING
Filed May 21, 1949

INVENTOR.
CHESTER C. BRUMBAUGH
BY
Thornton F. Holden

Patented Apr. 21, 1953

2,635,865

UNITED STATES PATENT OFFICE 2,635,865

KILN LINING

Chester C. Brumbaugh, Painesville, Ohio, assignor to Diamond Alkali Company, Cleveland, Ohio, a corporation of Delaware Application May 21, 1949, Serial No. 94,544

2 Claims. (Cl. 263—33)

This invention relates to the insulation of the "hot" or calcining zone of a rotary kiln, particularly a rotary kiln employed in the calcining of minerals and analogous substances, and to rotary kilns having insulated hot zones.

Lining structures heretofore proposed for kilns employed in the calcining of minerals, such as dolomitic limestone, cement, magnesium oxide, and the like, have not uncommonly included sundry provisions for insulation of the end of the kiln into which materials to be calcined are fed, and sometimes provisions for insulation of the zone intermediate the feed zone and the fire zone, herein referred to as the "precalcine zone." These proposals have been to some extent employed in actual practice and in such cases have been accompanied with more or less success. Reduced heat losses, and thus fuel consumption, over structures operating without the benefit of such insulation have been experienced.

Moreover, proposals have been made to insulate the calcining or "hot" zone of such kilns, though in this case, the suggestions have not been successfully reduced to practice. In the few cases where actual attempts at such insulation have been made, the insulation, being originally efficient, has resulted in a kiln lining structure having a useful life so short as to preclude a repetition of the attempt to insulate and necessitate the conclusion that the attempt has been a failure.

Prior art teachings for design of rotary kiln firing zones without insulation have usually included the provision of a lining of precast brick laid directly against the kiln shell to provide an annulus of as much as nine inches or more in depth. The brick lining is customarily of basic character and may be of any of the well-known refractory materials, as, for example, forsterite, silica, alumina, magnesite, chrome ore and chrome magnesite, as well as the somewhat more recently employed magnesium orthosilicate.

While this type of kiln lining presents a strong working surface of suitable hardness and heat resistance necessary for the calcining of mineral substances, such refractory materials are at the same time relatively good heat conducting materials and thus relatively poor heat insulating materials. In the firing zone of a kiln lined in this manner, the temperature at the working surface of the bricks during a calcining operation, for example, when calcining limestone, may be of the order of 2600° F. The refractory bricks customarily employed for this purpose have a coefficient of thermal conductivity of the order of 10 to 20 B. t. u./hr./sq. ft./deg. Fahr./in. thickness. Assuming the lower thermal conductivity value, the working temperature and thickness of bricks noted above give a temperature of approximately 570° F. at the interface of the base of the bricks and the supporting steel shell and thus a heat loss of 2300 B. t. u./hr./sq. ft. The temperature differential of 2030° F. between the working face of the bricks and the base thereof causes the bricks to expand more at the working faces than at the bases, resulting in severe expansion strains and stress cracks forming in the brick. This weakens the structure materially and as mechanical stresses on the bricks are reversed with each rotation of the kiln under load, the weakened lining structure is soon destroyed, necessitating shut-down for expensive relining. The higher thermal conductivity range noted above is present with the basic type refractories, such as forsterite, alumina, and magnesite. While it is well-recognized that these materials have the greatest tendency to crack or spall under temperature stresses, they are the preferred lining materials because of their superior refractoriness.

Moreover, where a shut-down-start-up cycle of such a kiln becomes necessary during the operation thereof for purposes other than kiln relining, such as interruptions in a process unrelated to the kiln, the temperature stress damage to the brick lining is severe and as a result, it is a very generally understood detail of kiln operation technique that no more than two, or at the very most three, shut-downs are possible before a new lining becomes necessary. Even under the best conditions of operation obtainable, the tremendous heat differential from the working face to the base of the brick is such that no matter how efficiently the brick is laid into the kiln, mechanical failure, either from movement of the individual bricks as a result of the stresses noted above or spalling at the working face, is inevitable and dictates short life for the lining. Hence, the expense of maintenance is tremendous but heretofore it has been believed unavoidable.

Particularly in the case of limestone kilns, but also in kilns for burning other mineral substances, the recovery of gases of combustion and gases evolved from the minerals is not seldom an important economic advantage of the burning operation. Naturally, the higher strength gas recovered, the greater the value thereof. However, in the case of prior art limestone kilns, the necessity of providing a working temperature of 2600° F., while experiencing a heat loss of 2300 B. t. u./hr./sq. ft. in the calcining zone, means the use of a tremendous excess of fuel over that needed for the burning of the stone, itself no small economic disadvantage, and as an accompaniment of such excess of fuel, the introduction of equally substantial quantities of air to provide oxygen to support combustion. The accompanying nitrogen in the air, of course, provides a diluent for the desired gases, in the case of dolomite or limestone, $CO_2$, to a point that an operator finds himself faced with a vicious cycle of fuel, air and diluted off-gases, the latter seldom, if ever, rising in concentration over 30% or 32% $CO_2$.

An apparently obvious solution of these difficulties has, as noted above, been postulated and in one of its forms comprises the provision of a monolithic layer of excellent insulating material, such as diatomaceous earth, covering the inner surface of the shell in the calcining zone to a depth of say three inches, and underlying an annulus of refractory brick, such as the forsterite brick noted hereinabove. Although by constructing a kiln lining in this manner, effective heat insulation of the kiln interior is obtained and a relatively low temperature at the outer surface of the shell body thereby results with consequent reduction of the heat losses and thus gas dilution noted above, the temperature at the interface between the insulating material and the refractory brick is generally higher than the temperature at which the diatomaceous earth, or other good heat insulator, has effective crushing strength. Thus, at the operating temperatures of calcining operations, such as the burning of limestone or dolomite, viz., of the order of 2600° F., all of the known substances which are good heat insulators have a very low crushing strength and consequently, a monolithic layer of such good insulating material at these temperatures tends to fracture and allow the over-lying refractory brick to shift position as the kiln is rotated under load conditions, which in turn removes the firm support, weakens the arch construction of the circular brick courses, and causes rapid destruction of the lining. For example, where the calcining operation is carried out at a temperature of the order of 2600° F., i. e., the temperature of the working face of the refractory brick lining of the kiln, and an annulus of diatomaceous earth insulating cement approximately three inches in thickness is provided between the refractory brick and the supporting shell of the kiln, the temperature at the interface of the brick and the diatomaceous earth insulation will be of the order of 2000°–2100° F. At this temperature, the diatomaceous earth insulation is extremely fragile and by its failure will allow the over-lying refractory brick to shift position as the kiln is rotated under load conditions, destroying the arch construction and causing the consequent rapid destruction of the entire lining structure.

The present invention has for its principal object the provision of a rotary kiln, especially for operations of the nature of burning of limestone or dolomite, both for the purpose of obtaining the calcined stone and to recover the off-gases, in which the calcining zone shall be provided with structures preventing the high heat losses heretofore experienced and yet having substantially longer life and resulting in a concentration of desired gases from the calcining operation significantly higher than that obtained in prior art constructions.

A further object is the provision of a rotary kiln having an intermediate monolithic structure of high crush strength at the operating temperatures to which it is subjected and relatively good insulating properties situated between the refractory brick of the kiln structure and the kiln shell.

A further object is the provision of such a structure having means in the shell to aid simultaneously in the immobilization of the intermediate structure and in the partial dissipation of heat through the lining, whereby even at the operating temperatures, the working temperature of the inserted monolith is not exceeded.

Figure 2:
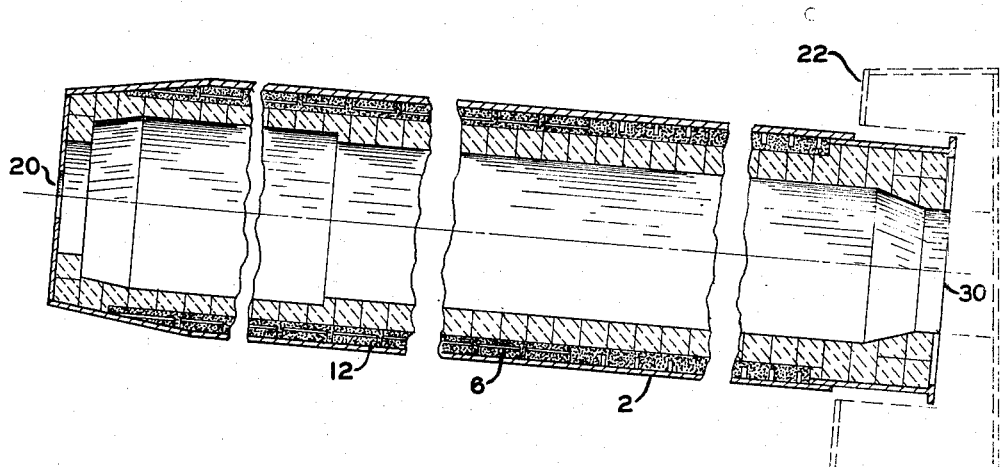

These and other objects and advantages of the invention will appear more fully from the detailed description following and from the drawing, in which:

Fig. 1 is a transverse vertical section of a kiln calcining zone having the structure of this invention, and Fig. 2 is a longitudinal sectional view of the same kiln with parts broken away.

Referring now to the drawing, a cylindrical metallic shell 2 is shown encasing the body of a rotary kiln having a feed end 20 and firing end 30. The kiln may have any suitable burner as is well-understood in the art, the burner not being shown as the present invention is not directed thereto. Shell 2 is the supporting structure for the kiln lining and has radially inwardly extending, regularly spaced metallic pins 4 integrally attached, as by welding, in the firing zone of the kiln, which pins may be of any suitable material, but for heat and corrosion resistance, are preferably of stainless steel. Over-laying pins 4 on the inner surface of the shell 2 is an annular monolith 8 of insulating concrete, which may suitably be a "Haydite"-"Lumnite" type, where the operating temperature is of the order of 2000° to 2600° F.

"Haydite" is the trade-name for an aluminum silicate material manufactured by the Hydraulic-Press Brick Company and obtained by burning clay or shale in a rotary kiln to incipient fusion to obtain an expanded product, which is crushed and screened to a uniform lightweight aggregate, which may be combined with a suitable refractory cement and water to form an insulating concrete.

"Lumnite" is the trade-name for a hydraulic refractory calcium aluminate cement manufactured by The Atlas Lumnite Cement Company. A representative analysis of an aluminate cement is 40% alumina, 40% lime, 15% iron oxides, and 5% silica or magnesia. Such material may be mixed with the "Haydite" or other aggregate of similar properties, as set forth hereinafter, in suitable proportions to give a refractory concrete having the desired crushing strength and heat transfer characteristics. In general, it has been found that a proportion of 1 part of "Lumnite" hydraulic cement combined with between 3 and 5 parts of "Haydite" aggregate and sufficient water to make a workable composition, yields a mix satisfactory for the lining material of this invention. Moreover, a proportion of 1 part of cement to 4 parts of aggregate is especially useful.

The above specifically described materials, i. e., "Haydite" and "Lumnite," represent the preferred combination of substances for use in the monolithic semi-insulating material of the present structure. However, many materials of these same general properties employed in substantially the same proportions are found to be useful for the specific purpose, the combination of properties necessary being the relatively low heat transfer value with the relatively high crush strength at elevated temperatures. Therefore, in general, it is preferable for the purpose of the present invention that the insulating concrete employed have a characteristic heat transfer coefficient ("K" value) of the order of 3.0–4.0 B. t. u./hr./sq. ft./deg. Fahr./in. @ 2000° F. and a crushing strength for brick of 1500 to 3000 lbs./sq. in. at 2000° F.

Material of the above-described heat transfer coefficient and crush strength may suitably be provided in the calcining zone of the kiln to a depth of between two and five inches, depending upon the working temperature to which the kiln is to be exposed and the extent to which it is possible to provide for the dissipation of some of the heat by pins 4 or equivalent means. In general, it has been found satisfactory to employ a layer of such insulating material of about three inches in depth. Moreover, the monolith of insulating concrete material may, if desired, extend uniformly throughout the length of the kiln body. Pins 4 aid materially in preventing shifting of the lining in the calcine zone during the starting and stopping of the rotation of the kiln as well as during its operation under load conditions and, as will be described more fully below, have a further important heat dissipating function.

In the firing zone of the kiln, a vertical cross-section of which is shown in Fig. 1, the annulus of insulating concrete is over-laid with refractory brick 10, preferably of the precast non-acidic type as mentioned hereinabove, such as forsterite or magnesium oxide. In this zone, in contrast to completely uninsulated structures, the temperature gradient through the refractory brick is comparatively small, whereby the refractory brick lining is subject to less internal strain than is the case where a large temperature differential from the working faces to the bases thereof exists. The temperature of the insulating concrete, particularly at the interface between the refractory brick lining and the insulating concrete, is controlled in part by the heat conductivity of the insulating concrete and in part by the pins 4 integral with the metallic shell 2 and covered by the monolith 8, through which further heat transmission may readily take place. However, as will be understood by the relatively low heat transfer coefficient prescribed, the insulation provided is deliberately not entirely efficient. Accordingly, in the zone of the kiln where the severest working conditions exist under work load, there is provided means by which the effects of the temperature sensitivity of the various materials of construction involved, and the overall heat losses and resulting inefficiencies, are reduced to a practical minimum.

As will be understood by those skilled in the art, the firing end of the kiln need not be insulated to the actual end as a ring of a few feet at the end will not be subjected to the extreme temperatures discussed hereinabove for the actual fire zone. Moreover, it is standard practice in the design of rotary kilns of this type to provide covering means at both ends of the kiln, such as hood 22, indicated diagrammatically at the fire end. In usual cases, this end ring portion amounts to one-fifteenth or less of the length of the actual firing or calcining zone.

In the precalcine zone of the kiln, as shown in Fig. 2, an annular monolith 12 of insulating material may be provided to over-lay T-bars 6, which are spaced radially upon the inner surface of the metallic shell 2 of the kiln in such a manner that the shaft of the T is attached to the inner surface of the shell 2. In addition, the T-bars 6 provide additional reinforcement for the monolith 8 and serve to stiffen the shell. The precalcine zone of the kiln is also provided with brick 10, which may be of the type illustrated particularly in Fig. 1 of the drawing.

The material used in accordance with the present invention as an insulating material for the hot or calcine zone of a rotary kiln is by no means a new material which has recently become available, but on the contrary, has been available on the market for a period of almost thirty years. During that time, the material has been applied to a wide variety of refractory uses and has given excellent and very satifactory service in performance.

Within the same period of thirty years, the problem of efficient operation, especially in the calcining zone of a rotary kiln, with all of the accompanying advantages to be obtained therefrom, as pointed out in the early part of this discussion, has also existed and has not advanced from the stage at which it found itself about thirty years ago. In other words, the material available for the purpose of increasing the efficiency of such kilns has existed during this time and has been available for use for the purpose. The present solution, therefore, comprises the application of this well-known material to this old problem and the advantages which consequently flow therefrom.

In accordance with the present invention, rotary kilns of the general nature of those discussed herein, and more particularly of the character of lime burning kilns having firing zones roughly equivalent to one-third of their length, have been taken through as many as 10 to 15 shut-down-start-up cycles for reasons not having to do with inefficiencies in the kiln operation itself. Because of the more uniform heating and cooling of the brick along its radial depth and avoidance of differential temperature expansion or contraction stresses, such shut-down-start-up cycles have been accomplished without any difficutly in the loss of the lining through dropping out of bricks, excessive spalling, and the like. Kiln experts will recognize that this is an extraordinary experience in the kiln art and that, as noted above, two, or at the most three, shut-downs without relining the kiln have heretofore been considered excellent performance. It will be appreciated that some of the advantages of the present invention arise from the fact that the bricks are maintained more or less at the same temperature from working face to base in that the relatively inefficient insulating material permits some of the heat to flow away and especially through the pins 4 to the shell of the kiln, where it is dissipated. Thus, too efficient insulation would result in mechanical failure of the insulating material at operating temperatures and loss of the lining by lack of firm support and too inefficient heat insulation gives none of the advantages presently obtained in this construction.

An additional advantage of the present invention is the increased concentration of carbon dioxide to be obtained from the kiln when burning dolomitic limestone or limestone itself. Where heretofore prior art rotary kilns did well to obtain a concentration in off-gases of carbon dioxide of any more than 30% to 32%, the present structures consistently in burning oil produce 37% to 38% by volume of carbon dioxide in the off-gases. Especially where, as mentioned above, the concentration of the off-gases, which are to be used in other processes, is of significance in the operation of the kiln, it will be recognized that a very substantial economic advantage obtains.

Finally, a further and perhaps somewhat less significant advantage of the structure of the firing zone of the present kiln lies in the fact that the same is a good deal easier on the operating personnel in that the heat radiated from the firing zone is so relatively insignificant as to permit a worker to stand within relatively close proximity, such as six feet thereof, during the time the kiln is actually in operation with little more than discomfort from the radiated heat. In uninsulated firing zones, of course, the radiated heat has always amounted to a substantial hardship on operating personnel.

While there has been illustrated and described in detail an embodiment of the invention, the described structure is not intended to be understood as limiting the scope of the invention as it is realized that changes therewithin are possible and it is further intended that each element or instrumentality recited in any of the following claims is to be understood as referring to all equivalent elements or instrumentalities for accomplishing substantially the same results in substantially the same or equivalent manner, it being intended to cover the invention broadly in whatever form its principle may be utilized.

What is claimed is:

1. In a rotary kiln, a cylindrical metallic shell rotatable about its longitudinal axis and inclined from the horizontal, radially inwardly extending metallic projections integrally attached to said shell at regularly spaced points thereon, an annular monolith of insulating refractory concrete deposited on said shell to a depth which is in excess of the height of said metallic projections and not substantially less than two inches, said annular monolith being characterized by having a heat transfer coefficient of 3.0–4.0 B. t. u./hr./sq. ft./deg. Fahr./in. @ 2000° F. and a crushing strength for brick of 1500 to 3000 lbs./sq. in. at 2000° F., and an annulus of refractory brick overlaying and supported by said monolith.

2. In a rotary kiln having a calcining zone and a precalcining zone, a cylindrical metallic shell rotatable about its longitudinal axis and inclined from the horizontal, radially inwardly extending metallic pins attached to said shell at regularly spaced points thereon in said calcining zone, circumferentially spaced metallic T-bars attached to said shell at the base of their vertical shafts in said precalcining zone, an annular monolith of insulating refractory concrete deposited on said shell to a depth which is in excess of the height of said pins and said T-bars and not substantially less than two inches, said annular monolith being characterized by having a heat transfer coefficient of 3.0–4.0 B. t. u./hr./sq. ft./deg. Fahr./in. @ 2000° F. and a crushing strength for brick of 1500 to 3000 lbs./sq. in. at 2000° F., and an annulus of refractory brick overlaying and supported by said monolith in both of said zones.

CHESTER C. BRUMBAUGH.

References Cited in the file of this patent

UNITED STATES PATENTS

| Number | Name | Date |
|---|---|---|
| 87,231 | Yates | Feb. 23, 1869 |
| 796,170 | Allen | Aug. 1, 1905 |
| 1,314,461 | Boeck | Aug. 26, 1919 |
| 1,378,710 | Meyerhofer | May 17, 1921 |
| 1,387,505 | Metzger | Aug. 16, 1921 |
| 1,438,679 | Avan | Dec. 12, 1922 |
| 1,661,859 | Suppes | Mar. 6, 1928 |
| 1,940,277 | Stresau | Dec. 19, 1933 |
| 2,175,291 | Heskett | Oct. 10, 1939 |
| 2,206,277 | Crespi | July 2, 1940 |
| 2,230,141 | Heuer | Jan. 28, 1941 |